US012634631B2

(12) United States Patent
Zhang et al.

(10) Patent No.: US 12,634,631 B2
(45) Date of Patent: May 19, 2026

(54) SPEAKER

(71) Applicant: AAC Microtech (Changzhou) Co., Ltd., Changzhou (CN)

(72) Inventors: Chao Zhang, Changzhou (CN); Bo Peng, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 206 days.

(21) Appl. No.: 18/399,739

(22) Filed: Dec. 29, 2023

(65) Prior Publication Data

US 2024/0414477 A1 Dec. 12, 2024

Related U.S. Application Data

(63) Continuation of application No. PCT/CN2023/099481, filed on Jun. 9, 2023.

(51) Int. Cl.

| | |
|---|---|
| ***H04R 7/12*** | (2006.01) |
| ***H04R 1/02*** | (2006.01) |
| ***H04R 7/18*** | (2006.01) |
| ***H04R 9/02*** | (2006.01) |

(52) U.S. Cl.

CPC ............. *H04R 7/125* (2013.01); *H04R 7/127* (2013.01); *H04R 7/18* (2013.01); *H04R 9/025* (2013.01); *H04R 1/025* (2013.01)

(58) Field of Classification Search

CPC .......... H04R 7/125; H04R 7/127; H04R 7/18; H04R 9/025; H04R 1/025

See application file for complete search history.

(56) References Cited

U.S. PATENT DOCUMENTS

2020/0053476 A1* 2/2020 Xiao ...................... H04R 9/025
2020/0213749 A1* 7/2020 Chen ...................... H04R 1/026

FOREIGN PATENT DOCUMENTS

WO WO-2021000119 A1 * 1/2021 ............. H04R 7/127

* cited by examiner

*Primary Examiner* — Sunita Joshi
(74) *Attorney, Agent, or Firm* — Wiersch Law Group

(57) ABSTRACT

A speaker includes a frame, a vibration system including a diaphragm and a voice coil driving the diaphragm to vibrate and emit sounds, and a magnetic circuit system. The diaphragm includes a dome and a suspension surrounding the dome, the dome includes a first dome and a second dome stacked on the first dome, the second dome is smaller than the first dome and a projection of the second dome along a vibration direction of the diaphragm is entirely located on the first dome, the first dome is a metal dome, or a plastic dome, or a composite dome comprising a metal layer and a foam layer, the second dome is a metal dome, or a plastic dome, or a composite dome with a metal layer and a foam layer. Compared with the related art, the speaker disclosed by the present disclosure has a high strength of the dome.

5 Claims, 3 Drawing Sheets

SPEAKER

TECHNICAL FIELD

The present disclosure relates to an electro-acoustic device, in particular to a speaker.

BACKGROUND

Speakers, also known as loudspeakers, are used in loudspeaker boxes to achieve the conversion of audio signals into sound playback.

A related speaker usually includes a frame, and a vibration system and a magnetic circuit system fixed to the frame. The vibration system includes a diaphragm and a voice coil driving the diaphragm to vibrate and emit sounds. The diaphragm includes a dome and a suspension, there is only one dome which is made of a single material, the dome with this structure is difficult to meet the needs of thickness, rigidity, molding, heat dissipation, high frequency performance at the same time.

Therefore, it is a need to provide an improved speaker to solve the above problems.

SUMMARY

In view of the above, an objective of the present disclosure is to provide a speaker with a high strength of the dome.

In order to achieve the objective mentioned above, the present disclosure discloses a speaker, comprising a frame, a vibration system fixed to the frame, comprising a diaphragm and a voice coil driving the diaphragm to vibrate and emit sounds, and a magnetic circuit system fixed to the frame, wherein the diaphragm comprises a dome and a suspension surrounding the dome, the dome comprises a first dome and a second dome stacked on the first dome, the second dome is smaller than the first dome and a projection of the second dome along a vibration direction of the diaphragm is entirely located on the first dome, the first dome is a metal dome, or a plastic dome, or a composite dome with a metal layer and a foam layer, the second dome is a metal dome, or a plastic dome, or a composite dome comprising a metal layer and a foam layer.

As an improvement, the first dome comprises an upper surface away from the magnetic circuit system and a lower surface opposite to the upper surface, the first dome is provided with a receiving groove recessed from the upper surface to the lower surface, the second dome is accommodated in the receiving groove.

As an improvement, the receiving groove comprises a base and a connecting portion connected with the base and the upper surface, the connecting portion is an inclined surface.

As an improvement, the suspension is fixedly connected to the upper surface of the first dome.

As an improvement, the magnetic circuit system comprises a pole opposite to the dome, the pole is provided with an avoidance groove recessed in a direction away from the dome, a projection of the receiving groove along the vibration direction of the diaphragm is located in the avoidance groove.

As an improvement, a size of the receiving groove is the same as the avoidance groove, the projection of the receiving groove along the vibration direction of the diaphragm is entirely located in the avoidance groove.

As an improvement, a bonding layer is provided between the first dome and the second dome, the bonding layer is a glue or solder.

DESCRIPTION OF EMBODIMENTS

The technical solutions in embodiments of the present disclosure will be described clearly and completely below with reference to the accompanying drawings in the embodiments of the present disclosure.

Figure 1:
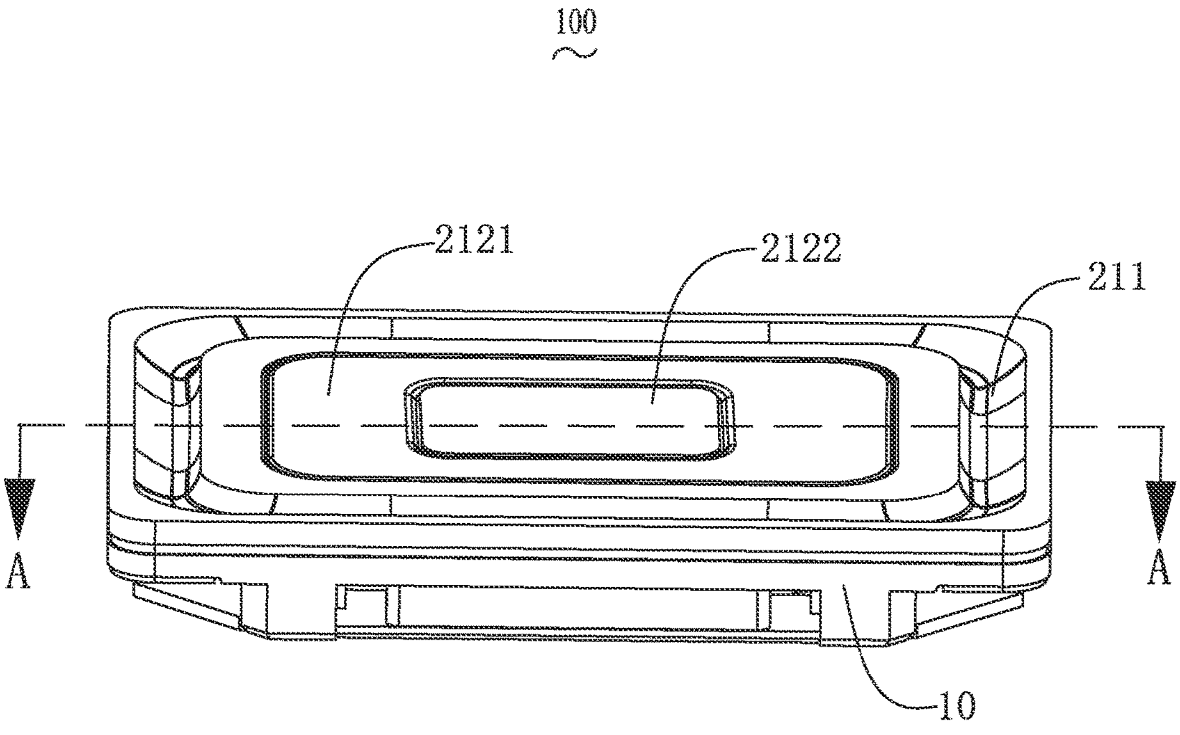
FIG. 1 is an isometric view of a speaker in accordance with an exemplary embodiment of the present disclosure.
Figure 2:
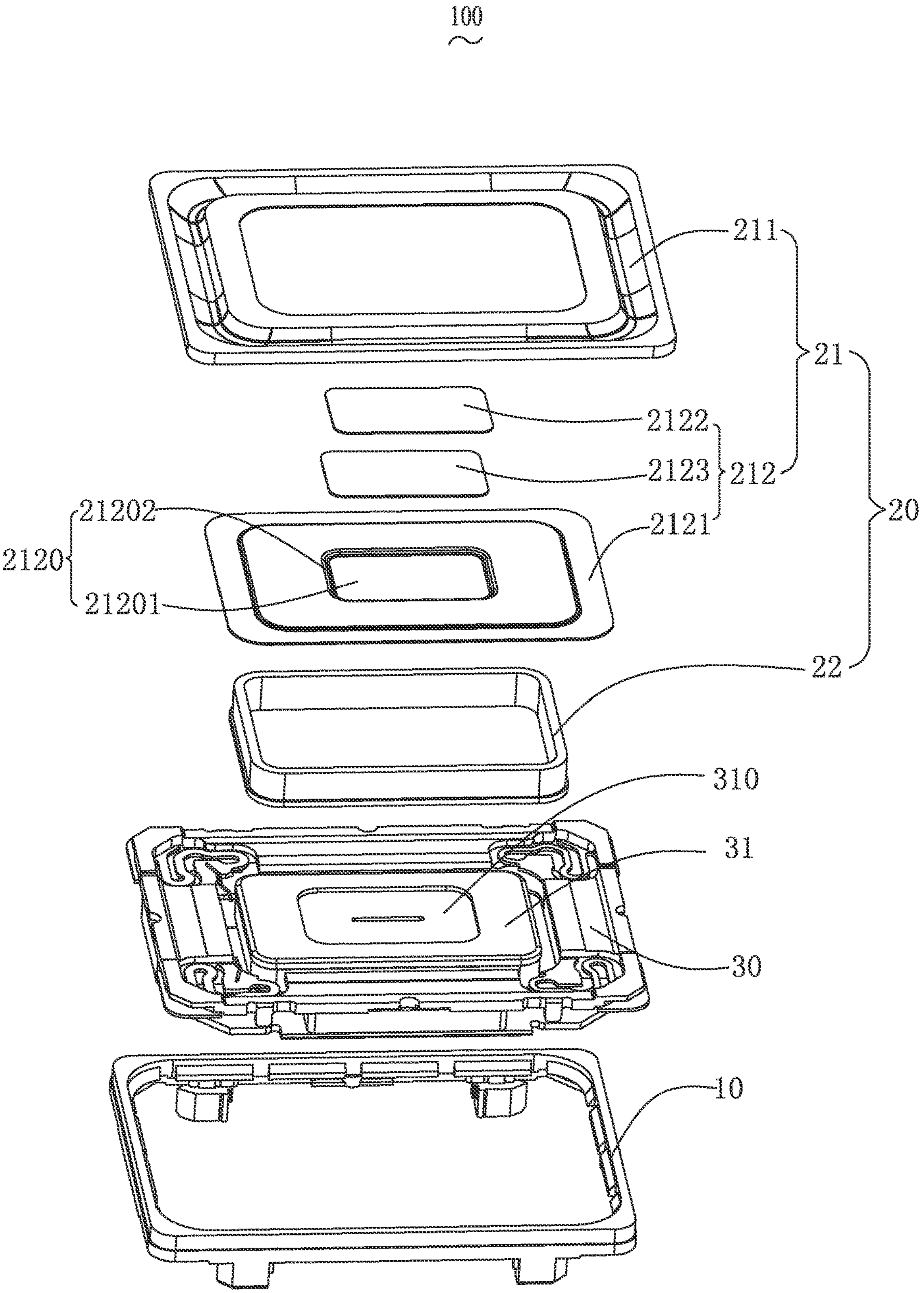
FIG. 2 is an exploded view of the speaker in FIG. 1.
Figure 3:
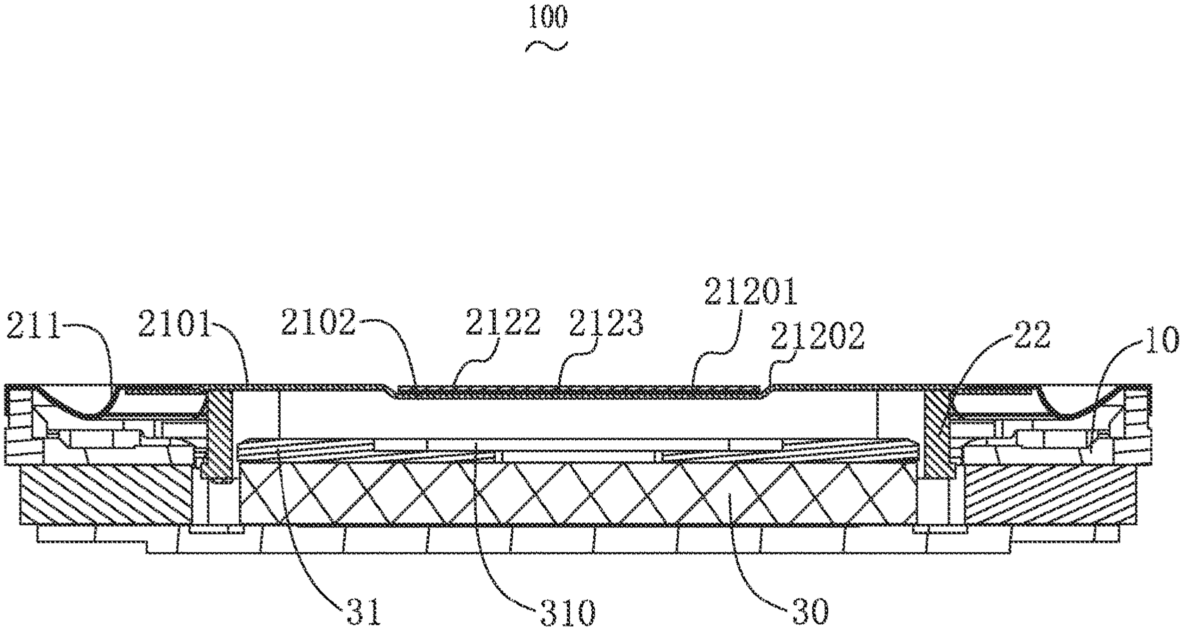
FIG. 3 is a cross-sectional view of the speaker taken along line A-A in FIG. 1.

As shown in FIGS. 1-3, the present disclosure discloses a speaker 100. The speaker 100 includes a frame 10, and a vibration system 20 and a magnetic circuit system 30 fixed to the frame 10.

The vibration system 20 includes a diaphragm 21 and a voice coil 22 driving the diaphragm 21 to vibrate and emit sounds. The diaphragm 21 includes a dome 212 and a suspension 211 surrounding the dome 212. The suspension 211 is a hollow ring structure with an inner edge connected to the dome 212 and an outer edge connected to the frame 10. The dome 212 includes a first dome 2121 and a second dome 2122 stacked on the first dome 2121, the first dome 2121 is fixedly connected with the suspension 211. The first dome 2121 is a metal dome, or a plastic dome, or a composite dome with a metal layer and a foam layer, the second dome 2122 is a metal dome, or a plastic dome, or a composite dome with a metal layer and a foam layer. Specially, the material of the metal dome or the metal layer is a metal such as aluminum, titanium, beryllium, lithium, magnesium and other metals and their alloys, and its thickness is 5-200 μm; the foam layer is consisted of common foam materials such as polyimide foam, PMI foam or polyester foam, the material of the plastic dome is a polyethylene naphthalene dicarboxylic acid ethylene glycol ester, a polyimide, or other plastic materials. A projection of the second dome 2122 along a vibration direction of the diaphragm 21 is entirely located on the first dome 2121, and the second dome 2122 is smaller than the first dome 2121. That is, the dome is set up as a localized multilayer, which enhances the strength of the dome 212.

The first dome 2121 and the second dome 2122 are connected together by a bonding layer 2123, the bonding layer 2123 may be a glue or a solder, the glue is one of a thermosetting epoxy adhesive, a phenolic adhesive, a bismarck resin, a hot-melt adhesive PE, a hot-melt adhesive PBT, and a reactive silicone adhesive. In other embodiments, the first dome and the second dome may also be fixedly connected by other means.

The first dome 2121 includes an upper surface 2101 away from the magnetic circuit system 30 and a lower surface 2102 opposite to the upper surface 2101, the second dome 2122 is located on the upper surface 2101 of the first dome 2121, preferably, the second dome 2122 is located on the center of the first dome 2121, and the suspension 211 is fixedly connected with an edge of the upper surface 2101 of the first dome 2121. In this embodiment, the first dome 2121 is provided with a receiving groove 2120 recessed from the upper surface 2101 to the lower surface 2102, the second dome 2122 is accommodated in the receiving groove 2120, thereby a multi-layer dome can be provided without increasing the overall height of the speaker 100, which will enhance the strength of the dome 212 and the performance of the speaker 100. In addition, the receiving groove 2120 includes a base 21201 connected with the second dome 2122 and a connecting portion 21202 connected with the base 21201 and the upper surface 2101, the connecting portion 21202 is an inclined surface which could enhance the vibrational reliability of the first dome 2121.

The magnetic circuit system 30 includes a pole 31 opposite to the dome 212, the pole 31 is provided with an avoidance groove 310 recessed in a direction away from the dome 212, a projection of the receiving groove 2120 along the vibration direction of the diaphragm 21 is located in the avoidance groove 310. A size of the receiving groove 2120 is the same as the avoidance groove 310, and the projection of the receiving groove 2120 along the vibration direction of the diaphragm 21 is entirely located in the avoidance groove 310. The avoidance groove 310 could provide more vibration space for the dome 212.

In this embodiment, the dome 212 includes a first dome 2121 and a second dome 2122 stacked on the first dome 2121, which could enhance the strength of the dome 212 and improve the performance of the speaker 100.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A speaker, comprising:

a frame, a vibration system fixed to the frame, comprising a diaphragm and a voice coil driving the diaphragm to vibrate and emit sounds, and a magnetic circuit system fixed to the frame, wherein the magnetic circuit system comprises a pole opposite to the dome, the pole is provided with an avoidance groove recessed in a direction away from the dome, a projection of the receiving groove along the vibration direction of the diaphragm is located in the avoidance groove, the diaphragm comprises a dome and a suspension surrounding the dome, the dome comprises a first dome and a second dome stacked on the first dome, the second dome is smaller than the first dome and a projection of the second dome along a vibration direction of the diaphragm is entirely located on the first dome, the first dome is a metal dome, or a plastic dome, or a composite dome comprising a metal layer and a foam layer, the second dome is a metal dome, or a plastic dome, or a composite dome with a metal layer and a foam layer, the first dome comprises an upper surface away from the magnetic circuit system and a lower surface opposite to the upper surface, the first dome is provided with a receiving groove recessed from the upper surface to the lower surface, the second dome is accommodated in the receiving groove.

2. The speaker described as claim 1, wherein the receiving groove comprises a base and a connecting portion connected with the base and the upper surface, the connecting portion is an inclined surface.

3. The speaker described as claim 1, wherein the suspension is fixedly connected to the upper surface of the first dome.

4. The speaker described as claim 1, wherein a size of the receiving groove is the same as the avoidance groove, the projection of the receiving groove along the vibration direction of the diaphragm is entirely located in the avoidance groove.

5. The speaker described as claim 1, wherein a bonding layer is provided between the first dome and the second dome, the bonding layer is a glue or solder.

* * * * *